April 24, 1951 R. S. DAVIS 2,550,108
COMBINATION COOKING AND SERVING UNIT
Filed Aug. 28, 1948 2 Sheets-Sheet 1
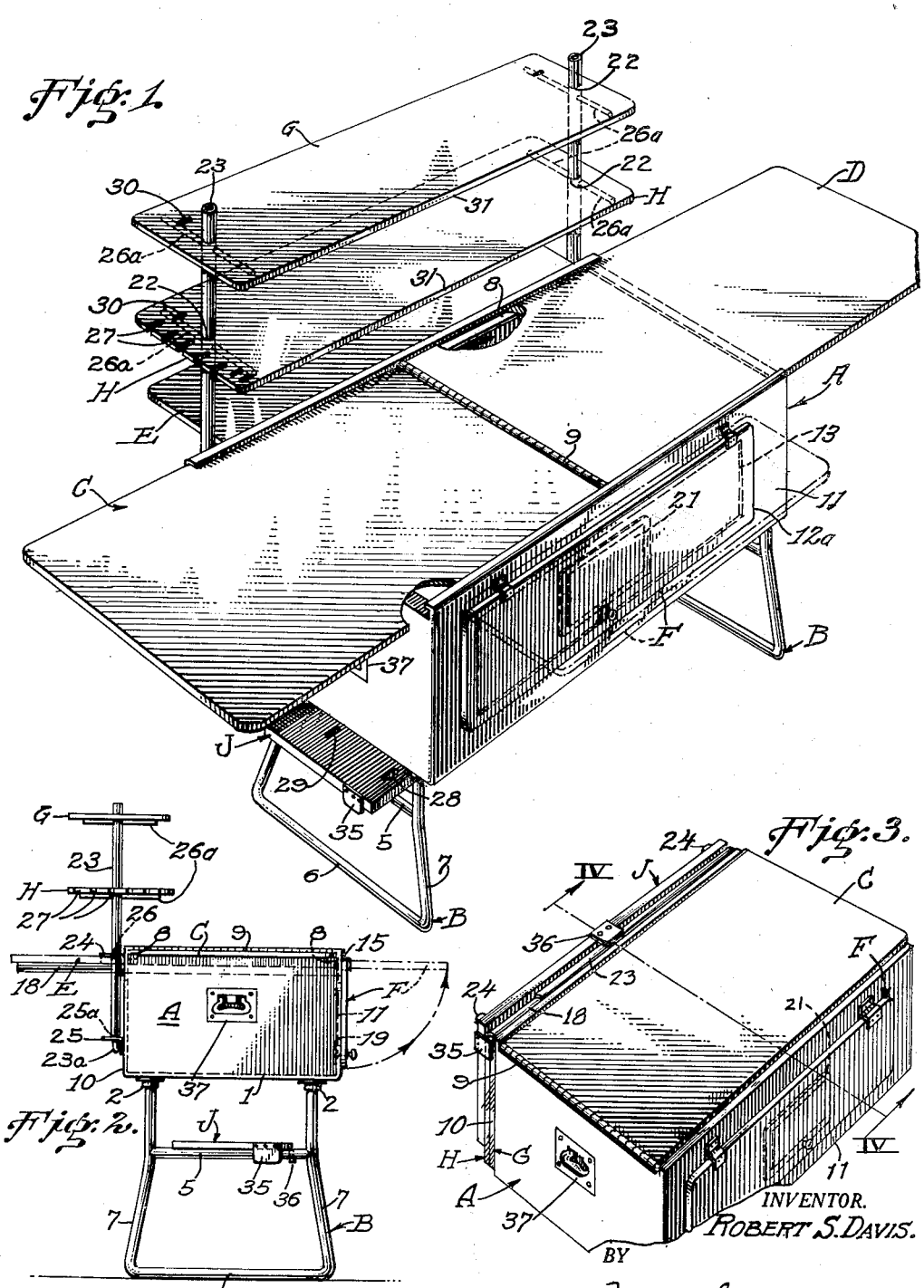

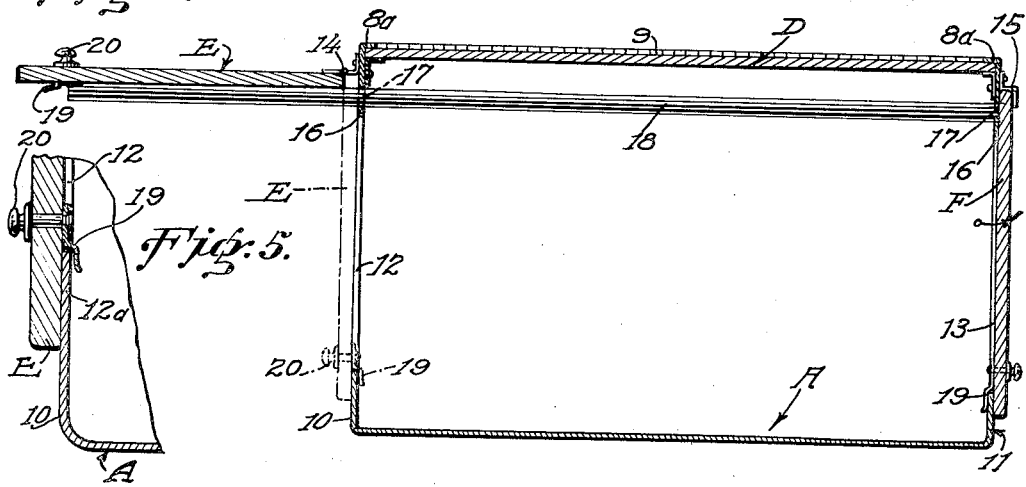
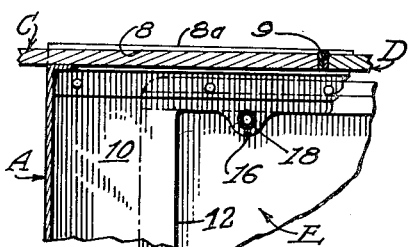
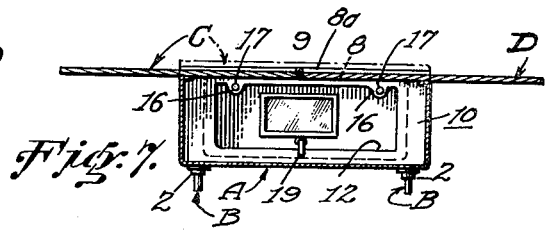
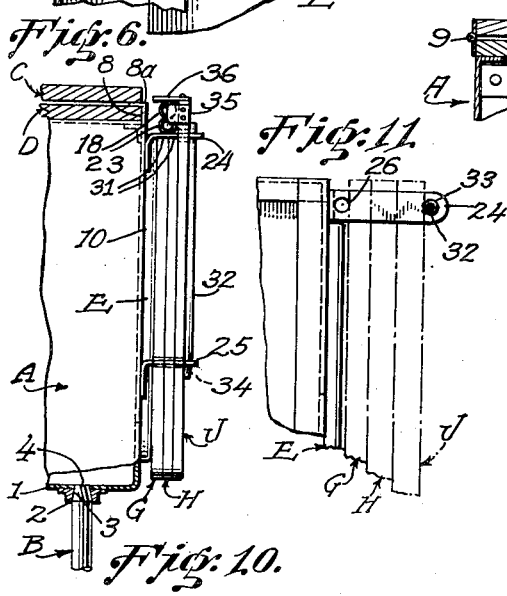
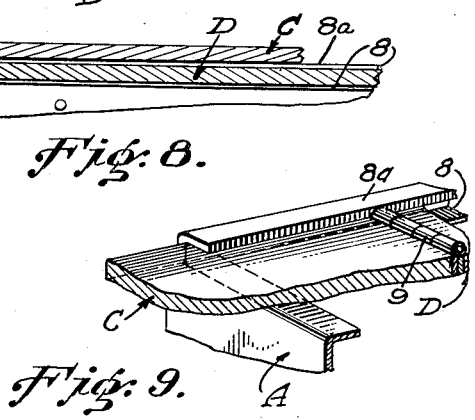

Patented Apr. 24, 1951

2,550,108

UNITED STATES PATENT OFFICE 2,550,108

COMBINATION COOKING AND SERVING UNIT

Robert S. Davis, Ajo, Ariz., assignor of one-half to Robert E. Edgington, Cleveland, Ohio Application August 28, 1948, Serial No. 46,639

3 Claims. (Cl. 190—12)

The present invention relates to improvements in a combination cooking and serving unit. It consists of the combinations, constructions and arrangements of parts as hereinafter described and claimed.

An object of my invention is to provide a combination cooking and serving unit which is an improvement over my copending application on a combination cooking and serving unit, Serial No. 749,316, filed May 20, 1947, which issued as Patent No. 2,497,156 on February 14, 1950.

In the copending case leaves are hinged to the outer surfaces of the cabinet and may be swung into horizontal positions for providing additional serving areas. In the present form of the invention the front and back walls of the cabinet are provided with large openings that are almost of the same size as the side walls. Doors are hinged to these walls and may be closed to cover the openings in the walls. When the doors or covers are swung into open position, they provide additional serving areas and when the doors are open, it is possible to gain access to the interior of the cabinet without the necessity of removing the top leaves. Moreover, if a camp stove is placed within the cabinet, either or both doors may be opened to afford proper ventilation for the operation of the stove.

In my copending case I show shelves removably disposed on standards and when these shelves are not used they can be placed within the cabinet. The shelves in the present form of the invention can be placed within the cabinet when not in use but I provide a novel shelf supporting means which will secure the shelves to one side of the cabinet where they will take up little space. If the shelves are carried on the outer side of the cabinet, this will permit the entire cabinet interior to be used for storage purposes.

In the present form of the invention the doors may be held in open position by tubular supports and these supports may be telescoped into the tubular shelf-supporting standards when the device is packed for transportation. The tubular standards are removed from their upright positions preparatory for packing. Novel means is furnished for securing the telescoped tubes to the exterior of the cabinet for shipment.

The device is simple in construction and is durable and efficient for the purpose intended.

Other objects and advantages will appear in the following specification, and the novel features of the device will be particularly pointed out in the appended claims.

My invention is illustrated in the accompanying drawings forming a part of this application, in which:

Figure 1 is a perspective view of the entire device shown in operative position;

Figure 2 is an end view of Figure 1;

Figure 3 is a perspective view of the device folded for transportation;

Figure 4 is an enlarged transverse section through the device taken along the line IV—IV of Figure 3, and illustrates one of the doors in open position;

Figure 5 is an enlarged section showing the door-latching means in detail;

Figure 6 is a longitudinal section on an enlarged scale of a portion of the device;

Figure 7 is a longitudinal section through the entire device on a reduced scale;

Figure 8 is an enlarged sectional detail illustrating how one of the leaves is superimposed on the other;

Figure 9 is a perspective sectional view on an enlarged scale illustrating how the leaves slide in guide channels and are interconnected by a piano hinge;

Figure 10 is a transverse section through the device and shows how the shelves may be secured to the cabinet in inoperative position for transportation, and Figure 11 is a top plan view of a portion of Figure 10.

While I have shown only the preferred form of my invention, it should be understood that various changes or modifications may be made within the scope of the appended claims without departing from the function and scope of the invention.

In carrying out my invention I provide a cabinet indicated generally at A and this cabinet is preferably rectangular in shape, but the corners are rounded so as to give a streamlined appearance to the cabinet. The cabinet may be made of wood, metal or any other material, but I have shown a metal cabinet in the accompanying drawings.

Reference to Figures 2 and 10 shows a bottom wall 1 of the cabinet provided with four socket members 2 and these sockets have tapered bores 3 (see Figure 10) for snugly receiving tapered tops 4 of U-shaped legs indicated generally at B. The legs have cross pieces 5 paralleling the cabinet bottom 1 and spaced substantially midway between the cabinet bottom and the base portions 6 of the legs. It will be seen from Figure 2 that the sides of each leg extending between the cross piece 5 and the base 6 are flared outwardly at a slight angle as shown at 7 while the portions of the leg extending above the cross piece are arranged parallel with each other. The snug fit between the tapered leg tops 4 and the tapered socket bores 3 will frictionally secure the legs to the cabinet. At the same time, the weight of the cabinet will aid in keeping the legs connected thereto. When the cabinet is packed for shipping, the legs can be removed from the sockets and placed within the interior of the cabinet.

The top of the cabinet is open and a pair of guide channels 8 are arranged along two longitudinal sides of the cabinet. Figure 1 shows the interior of the channels 8 facing each other and slidably receiving a pair of slidable leaves C and D that are hinged together by a piano hinge 9 at their adjacent edges. Reference to Figure 9 shows the guide channel 8 on a larger scale and indicates how the edges of the leaves C and D are slidably received in the channels. The piano hinge 9 does not extend throughout the entire width of the leaves C and D but terminates short thereof so as to permit the hinge to move between a top ledge 8a of both guide channels.

In normal use the two leaves C and D are arranged as shown in Figure 1 and this will provide a serving area for the top of the cabinet which is twice that of the cabinet top. When the device is to be shipped, either the leaf C or the leaf D is moved into a position for closing the entire cabinet top and then the other leaf is swung into a superimposed position over the leaf received in the guide channels. The superimposed leaf will rest on the upper surfaces of the ledge tops 8a, see Figure 8. The structure of the piano hinge 9 is such as to permit the leaf C, for example, to extend over the leaf D and be spaced therefrom the thickness of the top ledge 8a. In this simple way the large area of the combined two leaves can be reduced to an area which will cover the open top of the cabinet. Figure 3 also shows the leaf C in folded position when the device is ready for shipping.

The two longitudinally extending walls 10 and 11 of the cabinet are provided with openings 12 and 13 as shown in Figure 4. Doors or covers E and F are hinged to the walls 10 and 11 at 14 and 15 and the doors may be swung from closed position into open position. Figure 4 shows the door F closed and the door E open. In Figures 6 and 7 I show the opening 12 for the wall of the cabinet provided with a lug 16 that extends down into the opening and lies in the plane thereof, the lug being provided with an opening 17. Both openings 12 and 13 are provided with a pair of lugs 16 and tubular members 18 are slidably received in the openings 17 and are made long enough to support the doors E and F in open position. It is possible to have the tubular members 18 support only one of the doors in open position as illustrated in Figure 4. If the other door F is opened, the tubes will be moved to the right of Figure 4 so as to support both doors.

Any type of lock desired may be used for securing the doors in closed position. Referring to Figure 5, I show the door E provided with a latch 19 that may be rotated by means of a handle or knob 20 that extends to the outer surface of the door. When the door is swung into closed position, the latch 19 will drop into the position shown in Figure 5 due to gravity. In order to unlock the door, the knob 20 is rotated for swinging the latch 19 free from the edge 12a of the opening 12. In case of a windy day, it is sometimes wise to place the camp stove, not shown, within the interior of the cabinet A and then open one or both of the doors E and F to provide the proper ventilation. In this case the two leaves C and D will be removed or part way removed from the cabinet so that access can be had to the stove through the open top of the cabinet. It will be seen that one door may be closed if too great a draft is flowing through the cabinet interior. In Figure 1 I show the door F provided with a mirror 21 on its inner surface. The door may be swung through an arc of 180 degrees and thus permit the mirror to be used.

Both Figures 1 and 2 show shelves G and H and these two shelves have openings 22 therein for receiving tubular uprights or standards 23. Referring to Figure 2, it will be seen that the uprights 23 extend through top brackets 24 and also through lower brackets 25, these brackets being secured to the wall 10 of the cabinet A. The brackets 24 and 25 are spaced beyond the sides of the door E so as not to interfere with the opening thereof. The top brackets 24 have openings 26 therein for receiving the tubular uprights 23.

Again referring to Figure 2, it will be seen that the lower ends of the tubular uprights 23 are tapered at 23a. These tapered ends are received in tapered openings 25a provided in the brackets 25. The tapered ends when received in the tapered openings prevent the tubular uprights 23 from moving downwardly beyond the positions shown in Figure 2.

The tubular uprights 23 carry removable shelf-supporting crossbars 26a for supporting shelves G and H in spaced relation. Figure 1 illustrates the lower shelf H being spaced above the door E when the latter is in open position. One of the shelves, for example the shelf H, has one end provided with a plurality of slots and recesses 27 for removably receiving cake turners, ladles, knives, etc. The shelves are spaced far enough apart to support pots and pans and still not interfere with the use of the top of the door E when the latter is in open position.

In Figure 1 I also show a large lower shelf J which has a length susbtantially equal to that of the length of the cabinet interior. This shelf is placed on the cross pieces 5 of the legs B when the device is in use. It will be noted that the shelf J has slots 28 and 29 disposed at each end. When the device is packed for shipping, the shelf J is removed from the cross piece 5 and is mounted on the brackets 24 and 25, these brackets entering the slots 28 and 29. Before this is done the shelves G and H are removed from their upright supports 23 and are placed on the brackets 25, the brackets entering slots 30 provided in these shelves. The top edges 31 of the shelves G and H will lie just under the brackets 24, see Figure 10, when the shelves are supported by the brackets 25. After the two shelves G and H are mounted on the brackets 25, the wider shelf J is moved into position and receives both brackets, as shown in Figure 10. Retaining pins 32 are now inserted through openings 33 provided in the brackets 24 and are received in tapered openings 34 provided in the brackets 25. The lower ends of the pins 32 are tapered so that they will be held against downward movement after they are received in the openings of the brackets 25. The pins 32 hold the shelf J in place and the shelf in turn will hold the other two shelves in place.

When the device is collapsed for transportation purposes, the shelves will be in the position shown in Figures 3, 10 and 11. It will be seen from Figure 10 that the large shelf J has its upper edge extending above the tops of the brackets 24. The large shelf carries end clips 35 and a top clip 36. These clips cooperate with the brackets 24 and with the adjacent wall of the cabinet to provide a compartment that will receive the pair of telescoped tubes 18 and 23. Each tube 18 is slid within the large diameter tube 23 and then the telescoped tubes are placed on the brackets 24 and will be held against accidental removal by the clips 35 and 36 which cooperate with the shelf J and with the adjacent wall of the cabinet. It is also possible to place the cross bars 26ª within the tubes 18 if desired or these cross bars may be placed within the cabinet.

The ends of the cabinet are provided with flush handles 37 by means of which the cabinet may be carried. When the hinged doors are raised, access may be had to the inside of the cabinet without disturbing any articles on top. It is possible to use the device without legs, for example for beach use. The device can accommodate six people. It is also possible to withdraw either the leaf C or D from the guide channels 8, invert them, and then insert the free end of one of the hinged leaves into the guides 8 so that the other leaf can extend down to the ground to act as a supporting leg for the other end of the first-mentioned leaf.

The socket members 2 can act as glides when the legs are not inserted in the members. This will facilitate the handling of the unit when it is placed in or removed from an automobile or other vehicle. The tubular members 18 when supporting the doors E and F in a horizontal position, prevent the doors from swinging downwardly into closed position even though they might accidentally be swung into a raised position above the members. The doors when horizontally disposed can act as auxiliary shelves for supporting articles.

The retaining pins 32 may be two of the shelf-supporting cross bars 26a if desired. In this way two of the cross bars will have two uses and additional retaining pins 32 need not be provided. Wherever retaining pins 32 are mentioned in the specification, it should be kept in mind that two of the cross bars 26a can be used, and the other two placed within the tubes 18 or stored in the cabinet. The two cross bars 26a that would be used as retaining pins, would have their ends tapered so as to be received in the tapered openings 34 of the lower brackets 25.

The device is designed with the slidable top and hinged doors so that proper ventilation can be provided for the cabinet interior. While the cabinet provides an excellent storage space for food, it will also protect the food from vermin when camping or picknicking.

I claim:

1. In a device of the type described, a cabinet having hinged doors, means including tubular members for supporting the doors in open position, lower and upper brackets carried by the cabinet, tubular uprights removably secured to the brackets, shelves removably carried by the uprights, the shelves having openings for receiving the lower brackets when the shelves and uprights are removed and the shelves are placed adjacent to the cabinet, a larger shelf having openings for receiving both the lower and upper brackets, the larger shelf having its upper edge positioned above the upper edges of the other shelves when supported by the brackets, thereby providing a compartment with the adjacent wall of the cabinet for receiving the tubular members and uprights, means carried by the larger shelf for retaining the members and uprights, and means for securing the wider shelf to the brackets.

2. In a device of the type described, a cabinet having hinged doors, means including tubular members for supporting the doors in open position, lower and upper brackets carried by the cabinet, tubular uprights removably secured to the brackets, shelves removably carried by the uprights, the shelves having openings for receiving the lower brackets when the shelves and uprights are removed and the shelves are placed adjacent to the cabinet, a larger shelf having openings for receiving both the lower and upper brackets, the larger shelf having its upper edge positioned above the upper edges of the other shelves when supported by the brackets, thereby providing a compartment with the adjacent wall of the cabinet for receiving the tubular members and uprights.

3. In a device of the type described, a cabinet having hinged doors, means including tubular members for supporting the doors in open position, lower and upper brackets carried by the cabinet, tubular uprights removably secured to the brackets, shelves removably carried by the uprights, the shelves having openings for receiving the lower brackets when the shelves and uprights are removed and the shelves are placed adjacent to the cabinet, a larger shelf having openings for receiving both the lower and upper brackets, the larger shelf having its upper edge positioned above the upper edges of the other shelves when supported by the brackets, thereby providing a compartment with the adjacent wall of the cabinet for receiving the tubular members and uprights, the members being telescoped within the uprights, means carried by the larger shelf for retaining the telescoped members and uprights, and means for securing the wider shelf to the brackets.

ROBERT S. DAVIS.

REFERENCES CITED

The following references are of record in the file of this patent:

UNITED STATES PATENTS

| Number | Name | Date |
| --- | --- | --- |
| 1,381,682 | Webster et al. | June 14, 1921 |
| 1,445,566 | Stoll | Feb. 13, 1923 |
| 1,485,991 | Mulley | Mar. 4, 1924 |
| 1,540,133 | Kirkpatrick et al. | June 2, 1925 |
| 1,542,693 | Gordon et al. | June 16, 1925 |
| 1,924,430 | Woods | Aug. 29, 1933 |
| 1,949,099 | Burman | Feb. 27, 1934 |
| 2,274,077 | Marzolf | Feb. 24, 1942 |
| 2,431,711 | Scott | Dec. 2, 1947 |